May 29, 1956 H. C. LYONS 2,747,293
GYROSCOPIC ATTITUDE INDICATOR FOR AIRCRAFT
Filed Oct. 9, 1953 3 Sheets-Sheet 1

INVENTOR.
HORACE C. LYONS,
BY
McMorrow, Berman & Davidson
ATTORNEYS.

May 29, 1956     H. C. LYONS     2,747,293
GYROSCOPIC ATTITUDE INDICATOR FOR AIRCRAFT
Filed Oct. 9, 1953     3 Sheets-Sheet 2

INVENTOR.
HORACE C. LYONS,
BY
McMorrow, Berman + Davidson
ATTORNEYS.

May 29, 1956  H. C. LYONS  2,747,293
GYROSCOPIC ATTITUDE INDICATOR FOR AIRCRAFT
Filed Oct. 9, 1953  3 Sheets-Sheet 3

INVENTOR.
HORACE C. LYONS,
BY
McMorrow, Berman & Davidson
ATTORNEYS.

United States Patent Office 2,747,293
Patented May 29, 1956

2,747,293

GYROSCOPIC ATTITUDE INDICATOR FOR AIRCRAFT

Horace C. Lyons, Tucson, Ariz.

Application October 9, 1953, Serial No. 385,123

4 Claims. (Cl. 33—204)

This invention relates to instruments for indicating the attitude of an aircraft in relation to the ground, and more particularly to an improved attitude indicator which gives the operator of an aircraft a true indication of the orientation of the aircraft relative to the ground.

A main object of the invention is to provide a novel and improved artificial horizon instrument or attitude indicator for an aircraft which is simple in construction, which is easy to observe and interpret by the pilot of an aircraft, and which provides a form of presentation of the relative attitude of the aircraft over a wide range of pitch and bank angles, up to and including 90° angles, heretofore unobtainable with the artificial horizon instruments of the prior art.

A further object of the invention is to provide an improved artificial horizon instrument or attitude indicator for aircraft which involves inexpensive components, which is rugged in construction, and which provides a three-dimensional representation of the aircraft relative to the surface of the earth, the instrument being capable of representing any degree of bank or roll, including inverted flight, vertical climbs and dives, and any combination of angles of roll and climb or dive.

A still further object of the invention is to provide an improved artificial horizon instrument for aircraft which may be easily seen and interpreted by the pilot, which gives a true representation of the relative attitude of the aircraft in all possible positions, and particularly in the higher pitch angles, such as climb or dive beyond a 60° angle, or bank beyond 90°, the instrument providing a presentation which can be interpreted even by a relatively unskilled pilot.

Further objects and advantages of the invention will become apparent from the following description and claims, and from the accompanying drawings, wherein:

Figure 1:
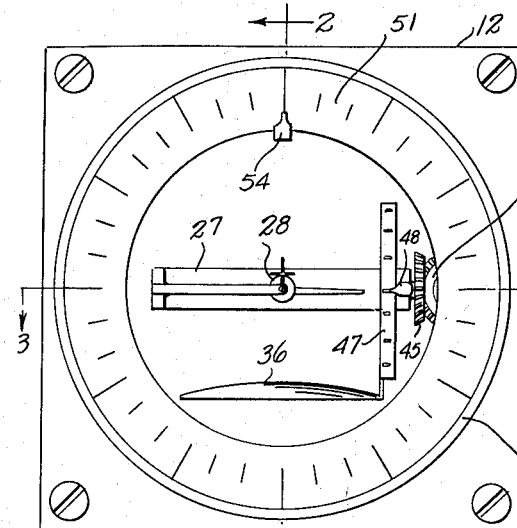
Figure 1 is a front elevational view of an improved attitude indicating instrument for aircraft according to the present invention.

Referring to the drawings, the instrument is designated generally at 11 and comprises a housing 12 which is mounted in the aircraft with its axis extending longitudinally relative to the aircraft. The housing 12 is provided with the hemispherical, transparent front viewing lens 13, secured to the forward end of the housing and serving as its end wall.

Figure 3:
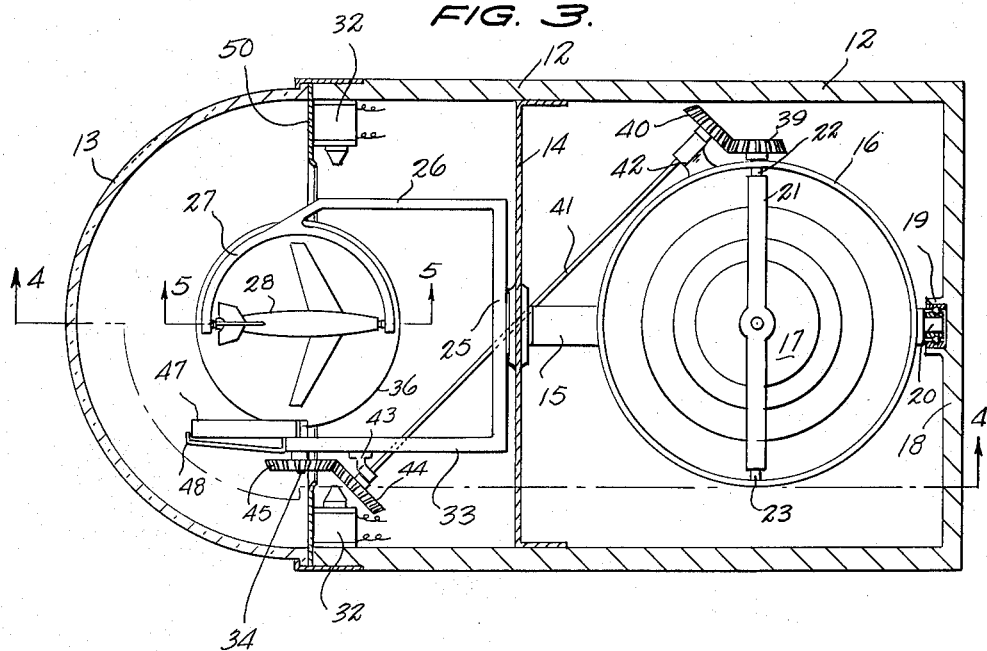
Figure 3 is a horizontal cross sectional view taken through the instrument on the line 3—3 of Figure 1.
Figure 4:
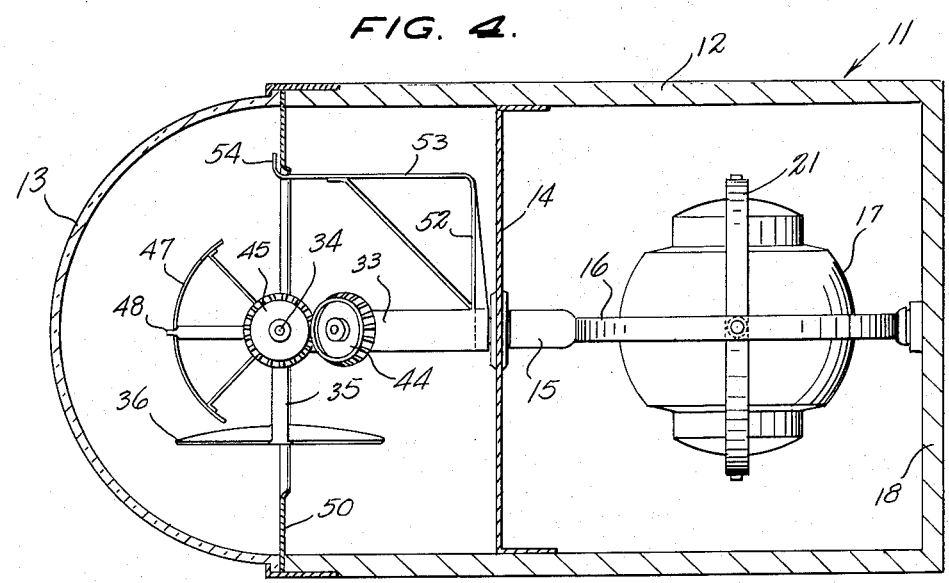
Figure 4 is a vertical cross sectional view taken on the line 4—4 of Figure 3.

Secured in the intermediate portion of the housing is the transverse vertical partition 14 and journaled in the partition is the longitudinally extending shaft element or arm 15 which is formed with the outer gimbal ring 16 of a gyroscope 17. As shown in Figure 3, the gimbal ring 16 is supported opposite partition 14 in the end wall 18 of the housing by a bearing unit 19 which rotatably receives the stub shaft element 20, said shaft element 20 being aligned with the main portion of the shaft 15, whereby the ring 16 is rotatably supported for rotation around the longitudinal axis defined by shaft elements 15 and 20.

Rotatably mounted in the gimbal ring 16 for rotation around an axis transverse to the axis defined by shaft elements 15 and 20 is a gimbal ring 21. Rotatably mounted in the gimbal ring 21 for rotation around an axis transverse to the axis of rotation of said gimbal ring 21 is the gyroscope 17, said gyroscope being of conventional construction and being driven in any suitable manner. The gyroscope 17 may, for example, be of the electrical type, and is well known per se, forming no part of the present invention. The gyroscope 17 may be energized to remain in a constant orientation relative to ground level, as for example, in a position perpendicular to ground level at all times.

As shown in Figure 3, the rotational axis of the gimbal ring 21 embodies opposed shaft elements 22, 23 which are rotatably supported in diametrically opposite portions of the outer gimbal ring 16.

The shaft element 15 extends forwardly through the transverse partition wall 14 and has secured to its forward end the bight 25 of a U-shaped member, the free end of the leg 26 of such member carrying a semicircular yoke element 27. The yoke element 27 has its respective arms terminating so that a diameter drawn through the end portions of said arms is substantially coaxial with the axis of rotation of the shaft elements 15 and 20, and hence extends longitudinally relative to the housing 12. Pivoted longitudinally between the ends of the arms of yoke 27 is the miniature aircraft 28 which serves as the main indicator element of the instrument.

Figure 5:
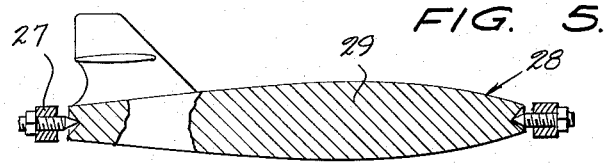
Figure 5 is an enlarged vertical cross sectional detail view taken on the line 5—5 of Figure 3.
Figure 6:
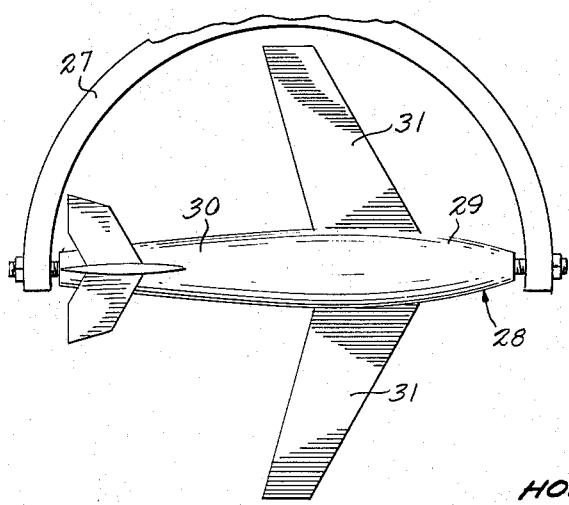
Figure 6 is a fragmentary horizontal plan view of the miniature aircraft employed as the main indicating element in the instrument illustrated in Figures 1 to 4.

Referring to Figures 5 and 6, the indicator element 28 comprises a body portion 29 of non-magnetic material, The wings 31, 31 are included with the body portion 29 and are of magnetic material. Secured in the opposite side portions of the housing 12, substantially in transverse alignment with the wing elements 31, 31 of the indicator element are the electromagnets 32, 32 which, when energized, magnetically couple with the magnetic wing portions of the indicator element and maintain said indicator element in a fixed position relative to housing 12. Obviously, permanent magnets may be employed in place of the electromagnets 32, if so desired.

The end of the other leg 33 of the U-shaped member has journaled therein a second transverse shaft element 34 which is therefore rotatable around an axis at right angles to the axis of the shaft element 15. Secured to the shaft 34 is the depending arm 35, and secured to the end of said depending arm 35 is the reference member 36 which extends substantially in a plane parallel to the axis of shaft 34. The reference member 36 is preferably a convex disc element of transparent material.

Figure 7:
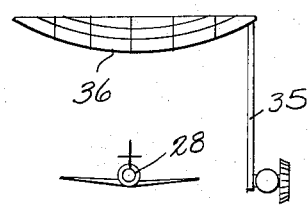
Figure 7 is a diagrammatic view illustrating the relative positions of the indicator element with respect to the reference member of the instrument of Figures 1 to 4, when the aircraft is undergoing inverted flight.
Figure 8:
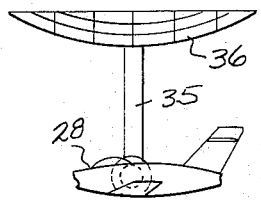
Figure 8 is a side elevational view of the elements illustrated in Figure 7.
Figure 9:
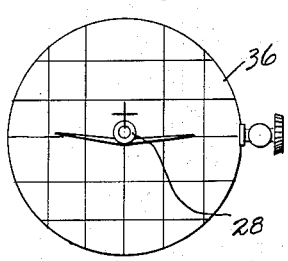
Figure 9 is a diagrammatic view illustrating the appearance of the indicator element relative to the reference member when the aircraft is in a vertical dive.
Figure 10:
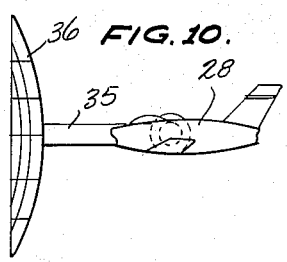
Figure 10 is a side elevational view of the element shown in Figure 9.
Figure 15:
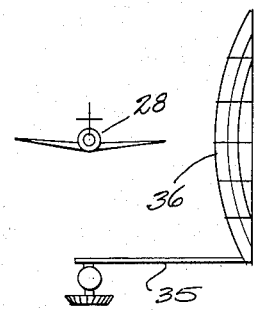
Figure 15 is a diagrammatic view illustrating the appearance of the main indicator element relative to the reference member when the aircraft is in a vertical bank.
Figure 11:
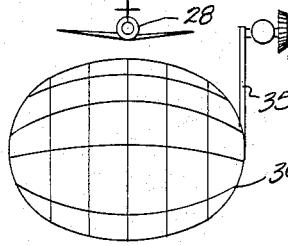
Figure 11 is a diagrammatic view illustrating the appearance provided by the indicator element relative to the reference member when the aircraft is undergoing a 45° dive.
Figure 12:
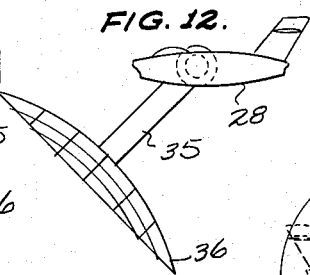
Figure 12 is a side elevation view of the element of Figure 11.
Figure 16:
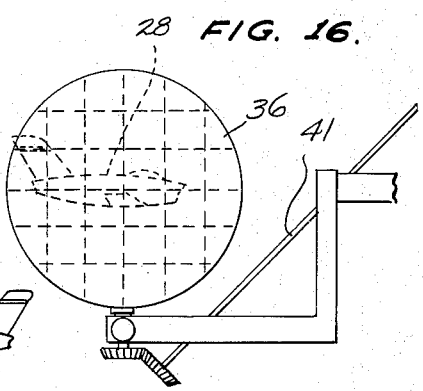
Figure 16 is a side elevational view of the element illustrated in Figure 15.
Figure 13:
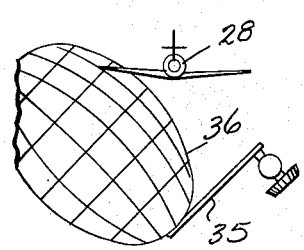
Figure 13 is a diagrammatic view illustrating the appearance of the main indicator member relative to the reference member when the aircraft is in a combined 45° bank and 45° dive.
Figure 14:
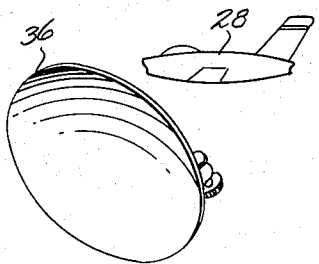
Figure 14 is a side elevational view of the elements of Figure 13.

Secured to the shaft element 22 of the gyroscope is a bevel gear 39 which meshes with a bevel gear 40 carried on a diagonal shaft 41 which is journaled in respective brackets 42 and 43 provided respectively on the outer gimbal ring 16 and on the leg 33, as shown in Figure 3. Secured to the forward end of the shaft 41 is a bevel gear 44 which meshes with a bevel gear 45 secured to the end of the shaft element 34, whereby the shaft 34 is gearingly coupled to the gimbal ring 21. Thus, when rotation of the gimbal ring 21 relative to housing 12 occurs, as when the aircraft is in a dive or climb, this is transmitted through bevel gears 39 and 40, shaft 41 and bevel gears 44 and 45 to shaft 34, and hence to the reference member 36, causing the reference member to become correspondingly inclined relative to the housing, namely, to rotate around a transverse axis with respect to said housing. Thus, as is illustrated in Figures 11 and 12, the indicator element 28 assumes an inclined position with respect to the reference member 36, corresponding to the actual inclined position of the aircraft relative to the ground. This is readily observable by the pilot through the transparent front lens 13 of the instrument. Similarly, in the case of a banking inclination of the aircraft, the gyroscope 17, remaining stationary, causes the housing 12 to be rotated relative to the outer gimbal ring 16, whereby the arm element 26 is rotated relative to the reference member 36. Since the indicator element is maintained in a constant position with respect to the housing 12 by the magnetic coupling between the magnets 32, 32 and the magnetic wing portions 31, 31 of the indicator element 28, this causes the indicator element 28 to rotate around its pivots in the ends of the arms of yoke 27, whereby the indicator element 28 assumes a position relative to the plane of said yoke corresponding to the actual inclined position of the aircraft, and this is readily observable by the pilot through the transparent lens 13, for example as illustrated in Figures 7 and 8, whereby the indicator element 28 is actually inverted, showing that the aircraft is undergoing inverted flight, or in Figures 15 and 16, where the indicator element 28 is at right angles to the reference member 36, showing that the aircraft is in a vertical bank. Figures 13 and 14 illustrate a condition wherein the aircraft is in a combined bank and dive, which is shown by the position of the indicator element 28 relative to the reference member 36.

It twill be readily apparent that the orientation of the aircraft relative to the ground can be observed at all times regardless of the steepness of pitch or bank of the aircraft, since a clear and unobstructed view of the indicator element 28 and its position relative to the reference member 36 is available regardless of the actual position of the aircraft relative to the ground.

Secured to the shaft 34 and extending in a plane normal to said shaft is the semicircular pitch scale 47 which faces forwardly, as shown in Figures 1 and 3 and which is concentric with the shaft 34. Secured to the end of the leg 33 of the U-shaped member is the indicating pointer 48 which extends adjacent the periphery of the scale 47 and thus serves to indicate the relative rotation occurring between the shaft 34 and the leg 33. Thus, by observing the position of the pitch scale 47 relative to the pointer 48, the pilot can determine the actual angle of climb or dive assumed by the aircraft.

Figure 2:
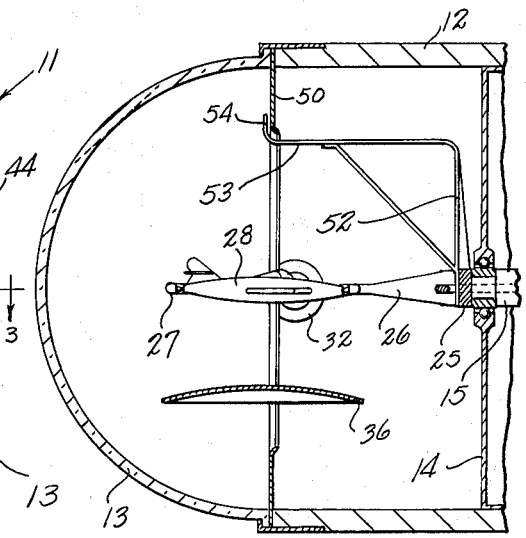
Figure 2 is a vertical cross sectional view taken on the line 2—2 of Figure 1, said view being taken through the forward portion of the instrument.

Secured transversely between the forward end of the housing 12 and the rim of the transparent lens 13 is the annular plate member 50 provided with a bank or roll scale 51. Secured to the bight 25 of the U-shaped member and extending normal thereto is the indicator arm 52 formed with the longitudinally extending pointer element 53 whose end 54 is formed to overlie the inner rim of the annular plate member 51, as is clearly shown in Figures 1 and 2, whereby the pilot may observe the actual angle of bank of the aircraft by noting the position of the pointer element 54 relative to the roll or bank scale 51. Thus, not only is the pilot able to observe immediately the orientation of the aircraft relative to the ground by noting the relative position of the indicating element 28 with respect to reference member 36, but the pilot can also immediately note the respective angles of pitch and bank by noting the positions of the pointer elements 48 and 54 with respect to the respective scales 47 and 51. It is readily apparent from the above description that a full view, three-dimensional presentation of the attitude of the aircraft relative to the ground is provided by the instrument under all positions which the aircraft may assume in flight. The miniature aircraft 28 is preferably painted with a light colored luminous paint and the remaining elements in the housing 12 with the exception of the reference member 36 are preferably painted with black, non-reflecting paint, as is the inside surface of housing 12. Thus, maximum visibility of the miniature aircraft 28 with respect to the reference member 36 may be had at all times. The scales and indicators are, of course, suitably painted or otherwise colored of contrasting colors to provide maximum visibility of the pointers 48 and 54 relative to the respective scales 47 and 51.

While a specific embodiment of an improved aircraft attitude indicating instrument has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an aircraft, an attitude indicator comprising a gyroscope mounted in the aircraft for universal rotation relative to said aircraft and being stabilized relative to earth, said gyroscope being provided with an outer gimbal ring, a shaft element rotatably supported on the aircraft for rotation around a longitudinal axis relative to the aircraft and being rigidly connected to said outer gimbal ring, an inner gimbal ring rotatably mounted in said outer gimbal ring for rotation around an axis transverse to the rotational axis of said shaft element, a U-shaped member having its bight secured to said shaft element, a reference member connected to one of the legs of said U-shaped member for rotation around an axis transverse to the rotational axis of said shaft element, means gearingly coupling the transverse axis of said inner gimbal ring to the transverse axis of said reference member and arranged to rotate said reference member around its transverse axis in accordance with dive or climb attitudes of the aircraft, said reference member being rotated by said shaft element around said longitudinal axis in accordance with bank attitude of the aircraft, an indicator element mounted on the other leg of said U-shaped member for rotation around a longitudinal axis relative to said aircraft, and means magnetically coupling said indicator element to the aircraft for stabilizing said indicator element relative to the aircraft.

2. In an aircraft, a housing, an attitude indicator comprising a gyroscope mounted in said housing for universal rotation relative to said aircraft and being stabilized relative to earth, said gyroscope being provided with an outer gimbal ring, a shaft element rotatably supported on said housing for rotation around a longitudinal axis relative to the aircraft and being rigidly connected to said outer gimbal ring, an inner gimbal ring rotatably mounted in said outer ring for rotation around an axis transverse to the rotational axis of said shaft element, a U-shaped member having its bight secured to said shaft element, a reference member connected to one of the legs of said U-shaped member for rotation around an axis transverse to the rotational axis of said shaft element, means gearingly coupling the transverse axis of said inner gimbal ring to the transverse axis of said reference member and arranged to rotate said reference member around its transverse axis in accordance with dive or climb attitudes of the aircraft, said reference member being rotated by said shaft element around said longitudinal axis in accordance with bank attitude of the aircraft, an indicator element mounted on the other leg of said U-shaped member for rotation around a longitudinal axis relative to said aircraft, means magnetically coupling said indicator element to the aircraft for stabilizing said indicator element relative to the aircraft, a bank angle scale mounted on said housing in a transverse vertical plane relative thereto, a bank indicating element secured to the bight of said U-shaped member and extending adjacent said bank indicating scale, a dive or climb angle scale secured to said reference member and arranged in a longitudinal vertical plane relative to the aircraft, and a dive or climb indicating element secured to the first-named leg of said U-shaped member and extending adjacent said dive or climb indicating scale.

3. In an aircraft, an attitude indicator comprising a gyroscope mounted in the aircraft for universal rotation relative to said aircraft and being stabilized relative to earth, said gyroscope being provided with an outer gimbal ring, a shaft element rotatably supported on the aircraft for rotation around a longitudinal axis relative to the aircraft and being rigidly connected to said outer gimbal ring, an inner gimbal ring rotatably mounted in said outer ring for rotation around an axis transverse to the rotational axis of said shaft element, a U-shaped member having its bight secured to said shaft element, a reference member connected to one of the legs of said U-shaped member for rotation around an axis transverse of the rotational axis of said shaft element, means gearingly coupling the transverse axis of said inner gimbal ring to the transverse axis of said reference member and arranged to rotate said reference member around its transverse axis in accordance with dive or climb attitudes of the aircraft, said reference member being rotated by said shaft element around said longitudinal axis in accordance with bank attitude of the aircraft, an indicator element mounted on the leg of said U-shaped member for rotation around a longitudinal axis relative to said aircraft, and means magnetically coupling said indicator element to the aircraft for stabilizing said indicator element relative to the aircraft, said reference member comprising a convex disc element of transparent material, and said indicator element comprising a miniature aircraft mounted for rotation around its longitudinal axis.

4. In an aircraft, a housing, an attitude indicator comprising a gyroscope mounted in said housing for universal rotation relative to said aircraft and being stabilized relative to earth, said gyroscope being provided with an outer gimbal ring, a shaft element rotatably supported on said housing for rotation around a longitudinal axis relative to the aircraft and being rigidly connected to said outer gimbal ring, an inner gimbal ring rotatably mounted in said outer ring for rotation around an axis transverse to the rotational axis of said shaft element, a U-shaped member having its bight secured to said shaft element, a reference member connected to one of the legs of said U-shaped member for rotation around an axis transverse to the rotational axis of said shaft element, means gearingly coupling the transverse axis of said inner gimbal ring to the transverse axis of said reference member and arranged to rotate said reference member around its transverse axis in accordance with dive or climb attitudes of the aircraft, said reference member being rotated by said shaft element around said longitudinal axis in accordance with bank attitude of the aircraft, an indicator element mounted on the other leg of said U-shaped member for rotation around a longitudinal axis relative to said aircraft, means magnetically coupling said indicator element to the aircraft for stabilizing said indicator element relative to the aircraft, said reference member comprising a convex disc element of transparent material, and said indicator element comprising a miniature aircraft mounted for rotation around its longitudinal axis, a bank angle scale mounted on the said housing in a transverse vertical plane relative thereto, a bank indicating element secured to the bight of said U-shaped member and extending adjacent said bank indicating scale, a dive or climb angle scale secured to said reference member and arranged in a longitudinal vertical plane relative to the aircraft, and a dive or climb indicating element secured to the first-named leg of said U-shaped member and extending adjacent said dive or climb angle indicating scale.

References Cited in the file of this patent

UNITED STATES PATENTS

| | | |
|---|---|---|
| 1,888,454 | Edson | Nov. 22, 1932 |
| 1,975,442 | Allen | Oct. 2, 1934 |
| 2,423,269 | Summers | July 1, 1947 |

FOREIGN PATENTS

| | | |
|---|---|---|
| 160,858 | Great Britain | Apr. 7, 1921 |